United States Patent
Liu et al.

(10) Patent No.: US 11,025,397 B2
(45) Date of Patent: Jun. 1, 2021

(54) QUICK ACKNOWLEDGEMENT REPLY METHOD AND APPARATUS

(71) Applicant: HUAWEI TECHNOLOGIES CO., LTD., Guangdong (CN)

(72) Inventors: Yun Liu, Shenzhen (CN); Zezhou Luo, Shenzhen (CN); Yuchen Guo, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 18 days.

(21) Appl. No.: 16/395,063

(22) Filed: Apr. 25, 2019

(65) Prior Publication Data

US 2019/0253226 A1    Aug. 15, 2019

Related U.S. Application Data

(63) Continuation of application No. PCT/CN2017/107473, filed on Oct. 24, 2017.

(30) Foreign Application Priority Data

Oct. 26, 2016    (CN) .......................... 201610962981.7

(51) Int. Cl.
*H04L 5/00* (2006.01)
*H04W 72/04* (2009.01)
(Continued)

(52) U.S. Cl.
CPC .............. *H04L 5/0055* (2013.01); *H04L 1/16* (2013.01); *H04L 1/18* (2013.01);
(Continued)

(58) Field of Classification Search
CPC ... H04L 1/1607; H04L 5/0007; H04L 5/0055; H04L 5/0094; H04W 72/0446; H04W 72/0453
See application file for complete search history.

(56) References Cited

U.S. PATENT DOCUMENTS 9,854,607 B1 *  12/2017  Chu .................... H04W 52/241
2007/0058575 A1 *  3/2007  Kwon ............... H04W 52/0238
                                                                    370/318
(Continued)

FOREIGN PATENT DOCUMENTS

CN         101502026 A      8/2009
CN         102217364 A      10/2011
(Continued)

OTHER PUBLICATIONS

Lee et al. U.S. Appl. No. 62/371,095, filed Aug. 4, 2016, hereinafter Lee'095 (Year: 2016).*

*Primary Examiner* — Wutchung Chu
(74) *Attorney, Agent, or Firm* — Womble Bond Dickinson (US) LLP

(57) ABSTRACT

This application discloses a quick acknowledgement reply method and apparatus, where the method includes the following steps: receiving, by an acknowledgement sending apparatus, a data frame sent by an acknowledgement receiving apparatus; and after successfully decoding the data frame, generating and replying with, by the acknowledgement sending apparatus, an acknowledgement ACK frame, where the ACK frame includes a physical layer part; and the physical layer part includes: a legacy short training field L-STF, a legacy long training field L-LTF, and identification information of a station. This application is advantageous in low overheads.

18 Claims, 9 Drawing Sheets

(51) Int. Cl.
*H04L 1/18* (2006.01)
*H04L 1/16* (2006.01)

(52) U.S. Cl.
CPC ... *H04W 72/0446* (2013.01); *H04W 72/0453* (2013.01); *H04L 5/0007* (2013.01)

(56) References Cited

U.S. PATENT DOCUMENTS

| | | |
|---|---|---|
| 2008/0037465 A1 | 2/2008 | Ngo et al. |
| 2009/0046618 A1 | 2/2009 | Shiba et al. |
| 2011/0222429 A1 | 9/2011 | Ito |
| 2014/0233553 A1 | 8/2014 | Gao et al. |
| 2015/0173070 A1 | 6/2015 | Aboul-Magd et al. |
| 2015/0319782 A1* | 11/2015 | Chu ............... H04L 1/1671 370/336 |
| 2016/0352553 A1* | 12/2016 | Zhu ............... H04L 27/2602 |
| 2016/0374009 A1* | 12/2016 | Hiertz ............... H04W 48/16 |
| 2016/0374081 A1* | 12/2016 | Asterjadhi ............ H04L 1/1614 |
| 2017/0078052 A1* | 3/2017 | Matsuo ............... H04L 1/1861 |
| 2017/0127440 A1* | 5/2017 | Chun ............... H04W 72/1284 |
| 2017/0142659 A1* | 5/2017 | Noh ............... H04W 52/0245 |
| 2017/0171878 A1* | 6/2017 | Chun ............... H04B 7/0404 |
| 2017/0338910 A1 | 11/2017 | Chun et al. |
| 2017/0339692 A1* | 11/2017 | Chun ............... H04W 72/0446 |
| 2018/0035387 A1* | 2/2018 | Yang ............... H04W 52/143 |
| 2018/0041917 A1* | 2/2018 | Xi ............... H04B 7/0404 |
| 2018/0310330 A1* | 10/2018 | Chun ............... H04L 5/0091 |
| 2019/0036754 A1* | 1/2019 | Lee ............... H04L 27/2627 |
| 2019/0159127 A1* | 5/2019 | Son ............... H04W 52/0219 |

FOREIGN PATENT DOCUMENTS

| | | |
|---|---|---|
| CN | 103095425 A | 5/2013 |
| CN | 103312466 A | 9/2013 |
| CN | 103686940 A | 3/2014 |
| CN | 105960807 A | 9/2016 |
| WO | 2016068582 A1 | 5/2016 |

\* cited by examiner

| Legacy short training field | Legacy long training field | Legacy signal field | Repeated legacy signal field |

FIG. 5-3

| Legacy short training field | Legacy long training field | Legacy signal field | Orthogonal frequency division multiplexing symbol |

FIG. 5-4

| Legacy short training field | Legacy long training field | Legacy signal field | Repeated legacy signal field | Orthogonal frequency division multiplexing symbol |

FIG. 5-5

| Legacy short training field | Legacy long training field | Legacy signal field | Repeated legacy signal field | Address information |

FIG. 5-6

QUICK ACKNOWLEDGEMENT REPLY METHOD AND APPARATUS

CROSS-REFERENCE TO RELATED APPLICATIONS

This application is a continuation of International Application No. PCT/CN2017/107473, filed on Oct. 24, 2017, which claims priority to Chinese Patent Application No. 201610962981.7, filed on Oct. 26, 2016. The disclosures of the aforementioned applications are hereby incorporated by reference in their entireties.

TECHNICAL FIELD

This application relates to the communications field, and in particular, to a quick acknowledgement reply method and apparatus.

BACKGROUND

In a wireless local area network (WLAN) shown in FIG. 1, an access point (AP) is responsible for bidirectional communication with a plurality of stations (STA). To be specific, the AP sends downlink data to STAs (for example, STA1 and STA2 in FIG. 1), or receives uplink data from a STA (for example, STA3 in FIG. 1).

FIG. 2 further shows a process of data transmission in the WLAN. In this example, the AP starts to perform clear channel assessment (CCA) on a channel at a moment t1. When the AP determines that the channel is idle, the AP starts to send a downlink data frame to the STA1 at a moment t2, and ends the sending of the downlink data frame at a moment t3. The STA1 receives the downlink data frame at a corresponding time. After a short interframe space (SIFS) time, if the STA1 correctly receives the downlink data frame, the STA1 sends an acknowledgement (ACK) or block acknowledgement (BA) frame to the AP at a moment t4. The AP receives the ACK or BA frame sent by the STA1, and confirms that the downlink data frame of the AP has been correctly received by the STA1, so as to end this downlink data transmission operation and release a right of using the channel. Likewise, when the STA2 has uplink data that needs to be sent to the AP, the STA2 performs CCA at a moment t5. If the STA2 determines that the channel is idle, the STA2 starts to send an uplink data frame to the AP at a moment t6, and ends the sending of the uplink data frame at a moment t7. After a SIFS time, if the AP correctly receives the uplink data frame, the AP sends an ACK/BA frame to the STA2 at a moment t8. After receiving the ACK/BA frame, the STA2 ends this uplink data transmission operation and releases a right of using the channel.

A length of an existing ACK data frame is relatively long, and requires relatively high power. In addition, the length is relatively long, and as a result, overheads of network resources increase.

SUMMARY

This application provides a quick acknowledgement reply method and apparatus, so as to reduce a length of an ACK data frame and reduce overheads of network resources.

According to a first aspect, a quick acknowledgement reply method is provided, where the method includes: receiving, by an acknowledgement sending apparatus, a data frame sent by an acknowledgement receiving apparatus; and after successfully decoding the data frame, generating and replying with, by the acknowledgement sending apparatus, an acknowledgement ACK frame, where the ACK frame includes a physical layer part; and the physical layer part includes: a legacy short training field L-STF, a legacy long training field L-LTF, and identification information of a station.

In the technical solution provided in the first aspect, the ACK frame has only the physical layer part, and has no remaining part (for example, a MAC part). Therefore, the technical solution reduces a length of the ACK frame and reduces overheads of network resources.

In one embodiment, the identification information of the station is carried in four additional subcarriers, and the four additional subcarriers are subcarriers numbered −28, −27, +27, and +28.

In one embodiment, the physical layer part includes a legacy signal field L-SIG

In one embodiment, the physical layer part includes a legacy signal field L-SIG, the identification information of the station is carried in a Rate field and a Tail field of the L-SIG, and the L-SIG carries indication information indicating that the ACK frame is an ACK of the data frame.

In one embodiment, the physical layer part includes a repeated legacy signal field RL-SIG.

In one embodiment, the physical layer part includes a legacy signal field L-SIG, the identification information of the station is carried in a Rate field and a Tail field of the L-SIG, the L-SIG carries indication information indicating that the ACK frame is an ACK of the data frame, and any combination of one or more of the Rate field, the Tail field, and the four subcarriers constitutes the identification information of the station.

In one embodiment, the physical layer part further includes a legacy signal field L-SIG and at least one OFDM symbol, where the at least one OFDM symbol is used to carry the identification information of the station.

In one embodiment, the physical layer part further includes an RL-SIG.

In one embodiment, when the at least one OFDM symbol is two OFDM symbols, the two OFDM symbols use different modulation schemes to indicate that the ACK frame is an ACK of the data frame.

According to a second aspect, a quick acknowledgement reply method is provided, where the method includes: receiving, by an acknowledgement sending apparatus, a data frame sent by an acknowledgement receiving apparatus; and after successfully decoding the data frame, generating and replying with, by the acknowledgement sending apparatus, an acknowledgement ACK frame, where the ACK frame includes a physical layer part; and the physical layer part includes: an Internet of Things short training field IoT-STF, an Internet of Things long training field IoT-LTF, and an Internet of Things signal field IoT-SIG; where a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame.

In the technical solution provided in the second aspect, the ACK frame has only the physical layer part, and has no remaining part (for example, a MAC part). Therefore, the technical solution reduces a length of the ACK frame and reduces overheads of network resources.

In one embodiment, the ACK frame further includes a negative IoT-STF basic waveform, and the negative IoT-STF basic waveform is a waveform obtained by converting bit values in a frequency-domain sequence of a used short training field IoT-STF into negative values.

According to a third aspect, a quick acknowledgement receiving method is provided, where the method includes: sending, by an acknowledgement receiving apparatus, a data frame to an acknowledgement sending apparatus; and receiving, by the acknowledgement receiving apparatus, an ACK frame sent by the acknowledgement sending apparatus, where the ACK frame includes a physical layer part; and the physical layer part includes: a legacy short training field L-STF, a legacy long training field L-LTF, and identification information of a station.

The technical solution provided in the third aspect supports implementation of the technical solution in the first aspect, and therefore the technical solution provided in the third aspect is advantageous in reducing system overheads.

According to a fourth aspect, a quick acknowledgement receiving method is provided, where the method includes: sending, by an acknowledgement receiving apparatus, a data frame to an acknowledgement sending apparatus; receiving, by the acknowledgement receiving apparatus, an acknowledgement ACK frame sent by the acknowledgement sending apparatus, where the ACK frame includes a physical layer part; and the physical layer part includes: an Internet of Things short training field IoT-STF, an Internet of Things long training field IoT-LTF, and an Internet of Things signal field IoT-SIG; where a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame; and determining, by the acknowledgement receiving apparatus based on the indication information, that the ACK frame is the ACK of the data frame, extracting the identification information of the acknowledgement sending apparatus in the IoT-SIG, and matching the identification information of the acknowledgement sending apparatus with a receive end address or a station identifier of the sent data frame, to identify the acknowledgement sending apparatus.

The technical solution provided in the fourth aspect supports implementation of the technical solution in the second aspect, and therefore the technical solution provided in the fourth aspect is advantageous in reducing system overheads.

According to a fifth aspect, a quick acknowledgement reply apparatus is provided, and the apparatus includes:

a receiving unit, configured to receive a data frame sent by an acknowledgement receiving apparatus; and a processing unit, configured to: after successfully decoding the data frame, generate and reply with an acknowledgement ACK frame, where the ACK frame includes a physical layer part; and the physical layer part includes: a legacy short training field L-STF, a legacy long training field L-LTF, and identification information of a station.

The quick acknowledgement reply apparatus provided in the fifth aspect removes a remaining part of the ACK frame, and therefore the apparatus reduces a length of the ACK frame and reduces system overheads.

According to a sixth aspect, a quick acknowledgement reply apparatus is provided, and the apparatus includes:

a receiving unit, configured to receive a data frame sent by an acknowledgement receiving apparatus; and a processing unit, configured to: after successfully decoding the data frame, generate and reply with an acknowledgement ACK frame, where the ACK frame includes a physical layer part; and the physical layer part includes: an Internet of Things short training field IoT-STF, an Internet of Things long training field IoT-LTF, and an Internet of Things signal field IoT-SIG; where a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame.

The quick acknowledgement reply apparatus provided in the sixth aspect removes a remaining part of the ACK frame, and therefore the apparatus reduces a length of the ACK frame and reduces system overheads.

According to a seventh aspect, a quick acknowledgement receiving apparatus is provided, and the apparatus includes:

a sending unit, configured to send a data frame to an acknowledgement sending apparatus; and a receiving unit, configured to receive an ACK frame sent by the acknowledgement sending apparatus, where the ACK frame includes a physical layer part; and the physical layer part includes: a legacy short training field L-STF, a legacy long training field L-LTF, and identification information of a station.

The quick acknowledgement receiving apparatus provided in the seventh aspect supports implementation of the technical solution in the fifth aspect, and therefore the apparatus is advantageous in reducing system overheads.

According to an eighth aspect, a quick acknowledgement receiving apparatus is provided, and the apparatus includes:

a sending unit, configured to send a data frame to an acknowledgement sending apparatus;

a receiving unit, configured to receive an acknowledgement ACK frame sent by the acknowledgement sending apparatus, where the ACK frame includes a physical layer part; and the physical layer part includes: an Internet of Things short training field IoT-STF, an Internet of Things long training field IoT-LTF, and an Internet of Things signal field IoT-SIG; where a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame; and a processing unit, configured to: determine, based on the indication information, that the ACK frame is the ACK of the data frame, extract the identification information of the acknowledgement sending apparatus in the IoT-SIG, and match the identification information of the acknowledgement sending apparatus with a receive end address or a station identifier of the sent data frame, to identify the acknowledgement sending apparatus.

The technical solution provided in the eighth aspect supports implementation of the technical solution in the sixth aspect, and therefore the technical solution provided in the eighth aspect is advantageous in reducing system overheads.

BRIEF DESCRIPTION OF DRAWINGS

To describe the technical solutions in embodiments of this application more clearly, the following briefly describes the accompanying drawings required for describing the embodiments. The accompanying drawings in the following description show merely some embodiments of this application, and a person of ordinary skill in the art may still derive another drawing from these accompanying drawings without creative efforts.

FIG. 3-1 is a schematic diagram of a data structure of an ACK frame in a WLAN;

FIG. 3-2 is a schematic diagram of a data structure of an L-SIG;

FIG. 4-1 is a schematic structural diagram of an ACK frame according to an embodiment of this application;

FIG. 4-2 is a schematic structural diagram of another ACK frame according to an embodiment of this application;

FIG. 5-1 is a first schematic structural diagram of an ACK frame according to another embodiment of this application;

FIG. 5-2 is a second schematic structural diagram of an ACK frame according to another embodiment of this application;

FIG. 5-3 is a third schematic structural diagram of an ACK frame according to another embodiment of this application;

FIG. 5-4 is a fourth schematic structural diagram of an ACK frame according to another embodiment of this application;

FIG. 5-5 is a fifth schematic structural diagram of an ACK frame according to another embodiment of this application;

FIG. 5-6 is a sixth schematic structural diagram of an ACK frame according to another embodiment of this application;

FIG. 6 is a schematic flowchart of a quick acknowledgement reply method according to still another embodiment of this application;

FIG. 6-1 is a schematic structural diagram of an ACK frame according to still another embodiment of this application;

FIG. 6-2 is a schematic structural diagram of another ACK frame according to still another embodiment of this application;

DESCRIPTION OF EMBODIMENTS

Figure 1:
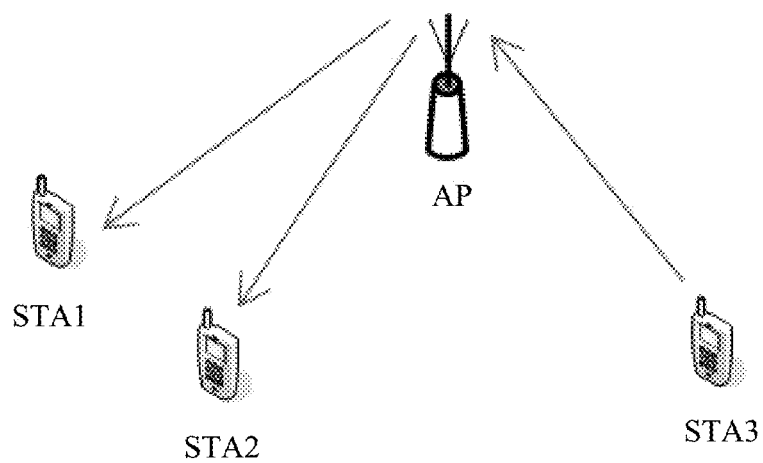
FIG. 1 is a schematic structural diagram of a wireless local area network.
Figures 1, 3:
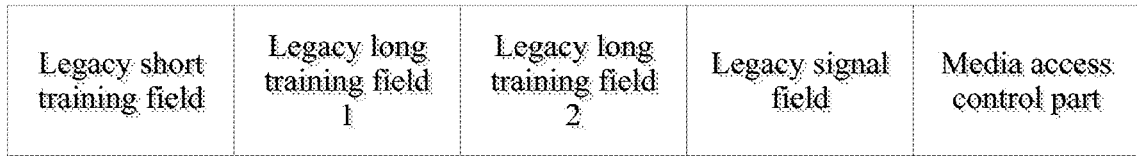
Figures 2, 3:
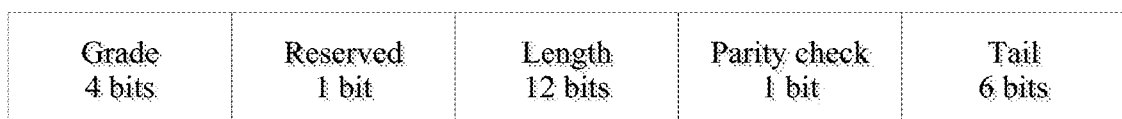

As shown in FIG. 3-1, FIG. 3-1 is a schematic diagram of a data structure of an ACK frame in a WLAN. As shown in FIG. 3, the ACK frame includes: a legacy short training field (L-STF), a legacy long training field (L-LTF), a legacy signal field (L-SIG), and a Media Access Control (MAC) part, where the L-STF, the L-LTF, and the L-SIG may be collectively referred to as a physical (PHY) part. As shown in FIG. 3, the PHY part is set in a header of the ACK frame, and the MAC part is set behind the PHY part.

Figure 2:
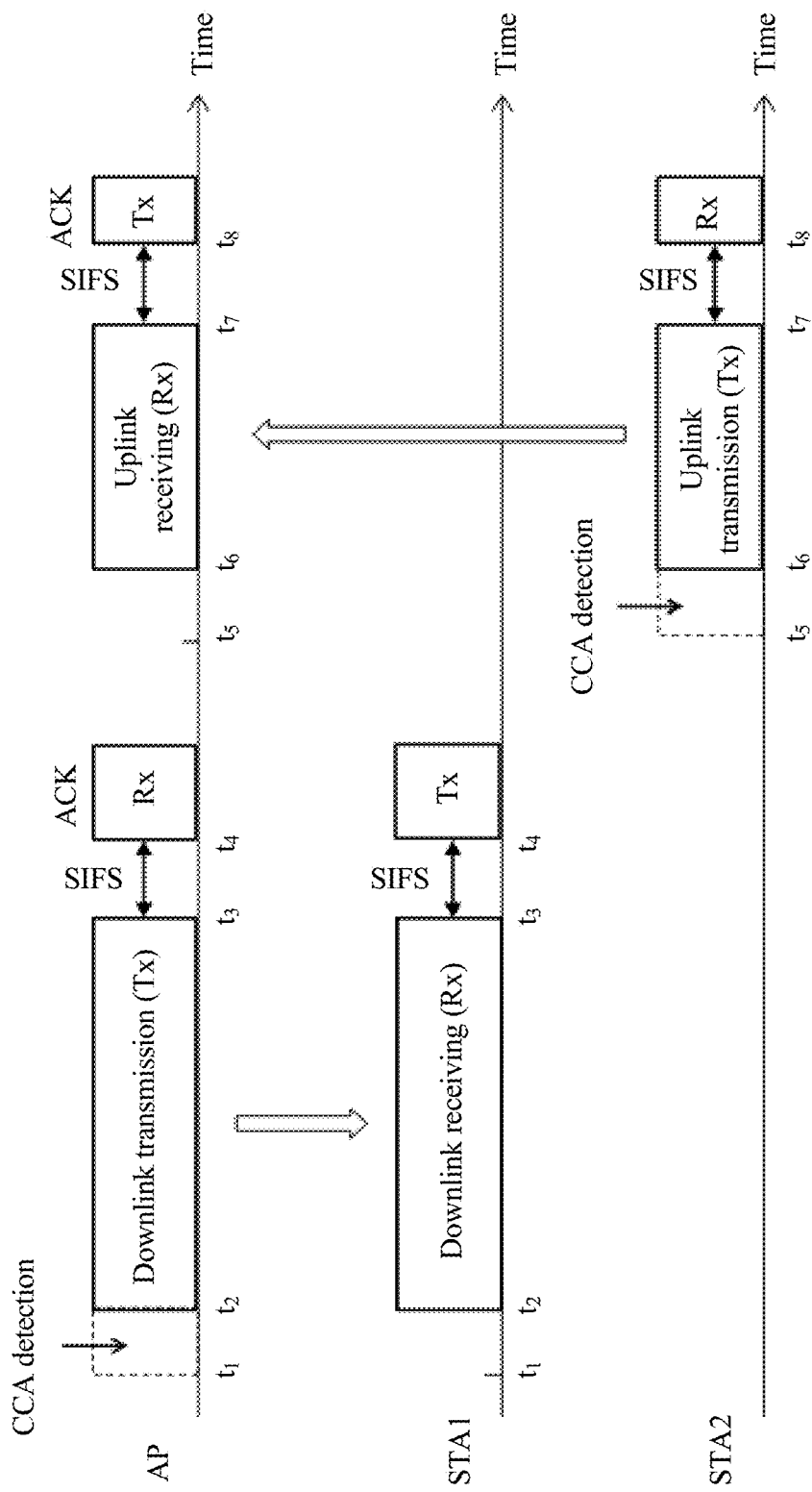
FIG. 2 is a schematic diagram of a data transmission process in a WLAN.

FIG. 3-2 is a schematic diagram of a data structure of an L-SIG. The L-SIG includes a 4-bit Rate field, a 1-bit Reserved field, a 12-bit Length field, a 1-bit Parity field, and a 6-bit Tail field.

Figure 4:
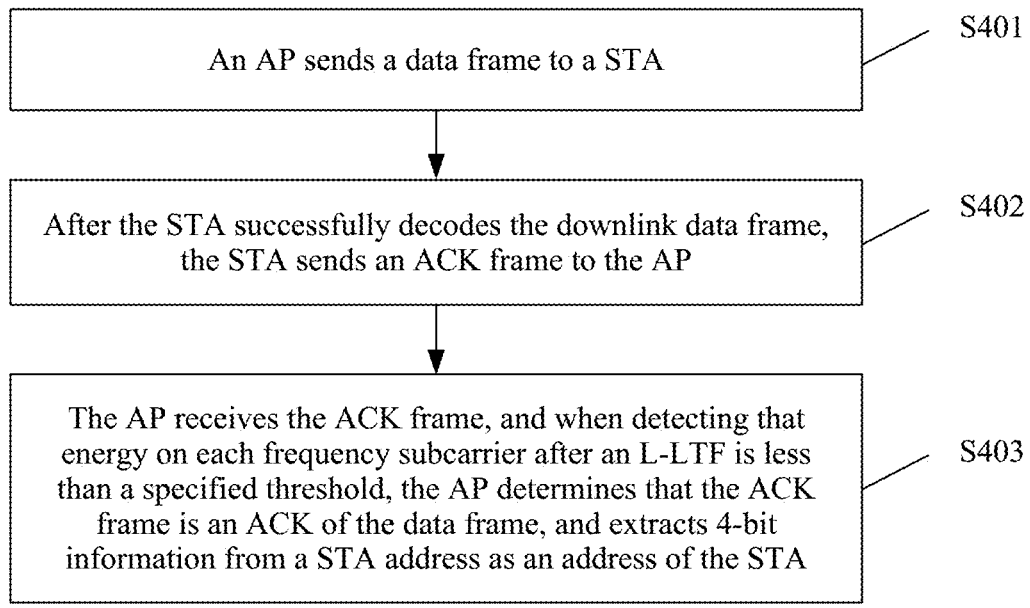
FIG. 4 is a schematic flowchart of a quick acknowledgement reply method according to an embodiment of this application.
Figures 1, 4:
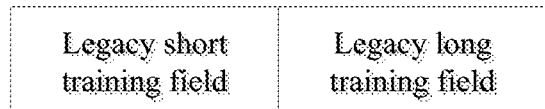
Figures 2, 4:
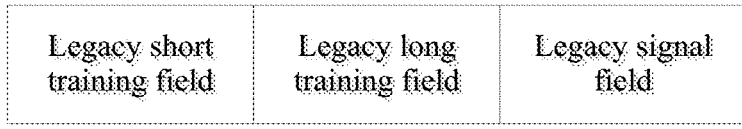

FIG. 4 shows a quick acknowledgement reply method according to this application. The method is implemented in the WLAN shown in FIG. 1. In this embodiment, a downlink data direction is used as an example. To be specific, a transmission direction in which an access point (AP) sends data to a station (STA) is used as an example. As shown in FIG. 4, the method includes the following blocks.

Block S401: The AP sends a data frame to the STA.

Block S402: After successfully decoding the downlink data frame, the STA sends an ACK frame to the AP, where the ACK frame includes an L-STF, an L-LTF, and 4-bit information (the 4-bit information is an optional technical solution) of a STA address carried in four additional subcarriers.

The four additional subcarriers in block S402 are four subcarriers numbered −28, −27, +27, and +28 used to transmit an indication signal. Specifically, a frequency of 20 MHz is used as an example. In the 20 MHz, the L-STF, the L-LTF, and an L-SIG separately occupy 48 or fewer subcarriers of 64 subcarriers in the 20 MHz, and 5 or 6 subcarriers are reserved on either side of the entire 20 MHz to avoid interference with an adjacent channel. With technology evolution, currently, only 3 or 4 subcarriers need to be reserved on either side of the 20 MHz to avoid interference with another channel. In an optional solution, the four additional subcarriers can be used to transmit data, and specifically, the four additional subcarriers numbered −28, −27, +27, and +28 are used to transmit data. A manner in which the four subcarriers transmit the 4-bit information may be as follows: For example, to transmit 1000, energy is superimposed on the −28 subcarrier, and energy is not superimposed on the three subcarriers of −27, +27, and +28. A specific frame structure thereof is shown in FIG. 4-1.

Block S403: The AP receives the ACK frame, and when detecting that energy on each frequency subcarrier after the L-LTF is less than a specified threshold, the AP determines that the ACK frame is an ACK of the data frame, and extracts the 4-bit information from the STA address as an address of the STA.

The block of extracting the 4-bit information from the STA address as an address of the STA in block S403 is an optional block.

An implementation method in block S403 may be specifically as follows: For the ACK frame shown in FIG. 3-1, the L-SIG needs to be transmitted in the L-LTF. However, for the ACK frame in this embodiment, because the ACK frame does not have an L-SIG, energy on each frequency subcarrier is relatively low as no data is transmitted on each subcarrier after the L-LTF. Theoretically, the energy on each frequency subcarrier is zero. However, considering a noise interference factor, that the energy on each frequency subcarrier is less than the specified threshold is selected herein as a condition for determining whether the ACK frame is an ACK of the data frame.

In the technical solution provided in an embodiment of this application, the ACK frame can be sent only by using a PHY part, and a MAC part is removed. Therefore, the technical solution is advantageous in reducing a length of an ACK data frame and reducing network resource overheads.

In one embodiment, as shown in FIG. 4-2, the ACK frame in the foregoing block S402 may further include an L-SIG. When the L-SIG is included, the foregoing block S403 may be replaced with the following block S403-2.

Block S403-2: The AP receives the ACK frame, and when detecting that energy on each frequency subcarrier after the L-SIG is less than a specified threshold, the AP determines that the ACK frame is an ACK of the data frame, and extracts the 4-bit information from the STA address as an address of the STA.

Figure 5:
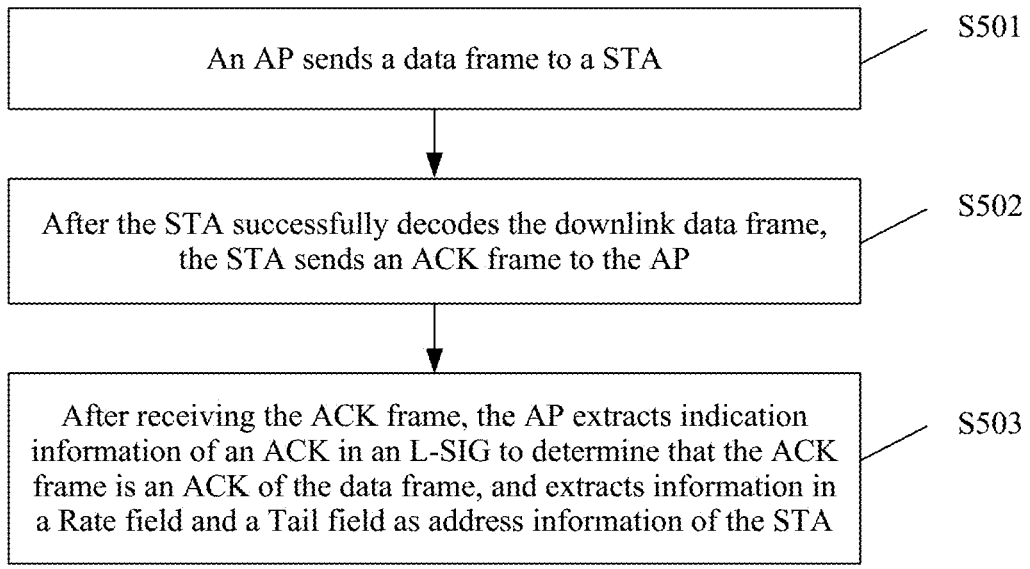
FIG. 5 is a schematic flowchart of a quick acknowledgement reply method according to another embodiment of this application.
Figures 1, 5:
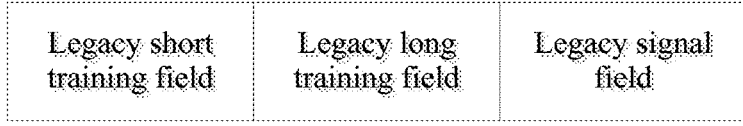
Figures 2, 5:
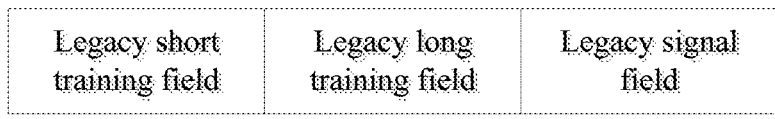

FIG. 5 shows a quick acknowledgement reply method according to another embodiment of this application. The method is implemented in the WLAN shown in FIG. 1. In this embodiment, a downlink data direction is used as an example. To be specific, a transmission direction in which an access point sends data to a station is used as an example. As shown in FIG. 5, the method includes the following blocks.

Block S501: The AP sends a data frame to the STA.

Block S502: After successfully decoding the downlink data frame, the STA sends an ACK frame to the AP, where the ACK frame includes an L-STF, an L-LTF, and an L-SIG The L-SIG in the foregoing block S502 includes indication information indicating that the ACK frame is an ACK of the data frame and address information of the STA carried in a Rate field and a Tail field. A structure of the ACK frame is shown in FIG. 5-1.

Block S503: After receiving the ACK frame, the AP extracts indication information of the ACK in the L-SIG to determine that the ACK frame is an ACK of the data frame, and extracts information in a Rate field and a Tail field as address information of the STA.

In a technical solution provided in another embodiment of this application, the L-SIG is modified to carry the address information of the STA and indicate that the ACK frame is the ACK of the data frame. In this way, the MAC part of the ACK frame shown in FIG. 3-1 is removable, thereby reducing a length of the ACK and reducing system overheads.

In one embodiment, the indication information indicating that the ACK frame is the ACK of the data frame in the foregoing block S502 may be specifically: a special value that is set in a Length field of the L-SIG For example, Length is set to 12 zeroes to indicate that the ACK frame is the ACK of the data frame; or in one embodiment, Length may be set to another value, for example, Length may be set to 12 ones to indicate that the ACK frame is the ACK of the data frame. In one embodiment, in actual application, the indication information may further be represented by another field of the L-SIG In one embodiment, as shown in FIG. 5-2 (dashed lines and solid lines above and below the L-SIG indicate four additional subcarriers), the ACK frame in the foregoing block S502 may further include 4-bit information in a STA address carried in the four additional subcarriers, and the foregoing block S503 may be replaced with the following block.

Block S503-2: After receiving the ACK frame, the STA extracts indication information of the ACK in the L-SIG to determine that the ACK frame is an ACK of the data frame, and extracts any combination of one or more of information in a Rate field, information in a Tail field, and information carried in four subcarriers to form address information of the STA (that is, identification information of the STA).

In one embodiment, as shown in FIG. 5-3, the ACK frame in the foregoing S502 may further include a repeated legacy signal field (RL-SIG).

In one embodiment, as shown in FIG. 5-4, the ACK frame in the foregoing block S502 may further include two orthogonal frequency division multiplexing (OFDM) symbols, and the two OFDM symbols are used to carry the address information of the STA. In one embodiment, the foregoing two OFDM symbols may further be used to carry the indication information indicating that the ACK frame is the ACK of the data frame. A specific implementation may be as follows: Two OFDM symbols of different modulation schemes are used to represent the indication information indicating that the ACK frame is the ACK of the data frame. For example, a first OFDM symbol is quadrature phase shift keying (QPSK) modulation, and a second symbol is binary phase shift keying (BPSK) modulation.

In one embodiment, as shown in FIG. 5-5, the ACK frame shown in FIG. 5-4 may further include an RL-SIG.

Figure 6:
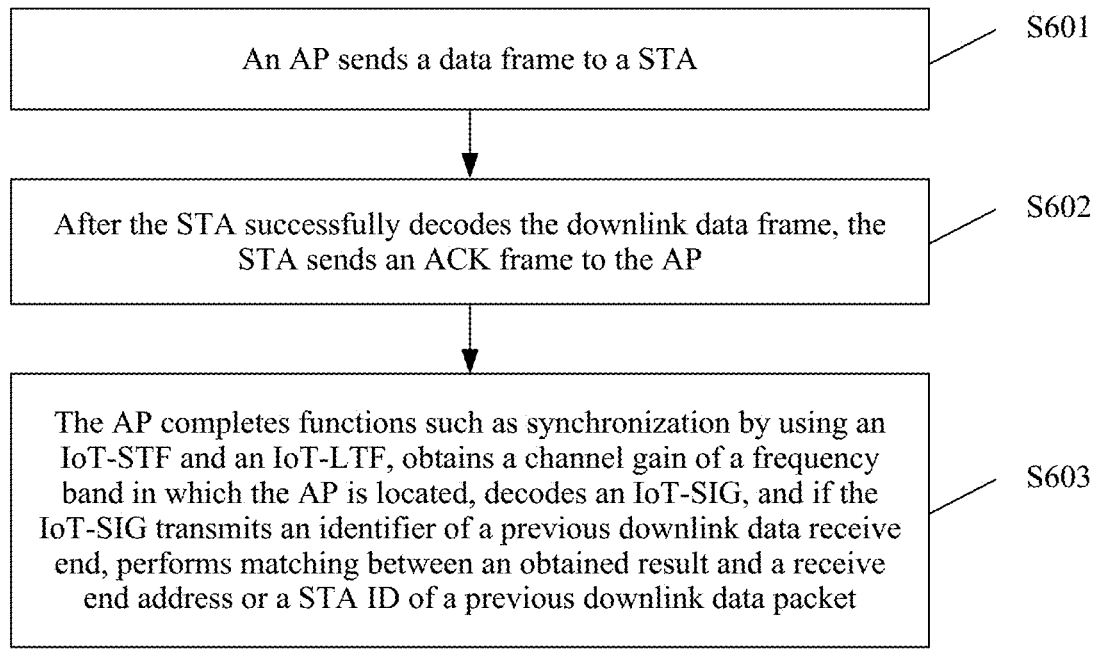
Figures 1, 6:
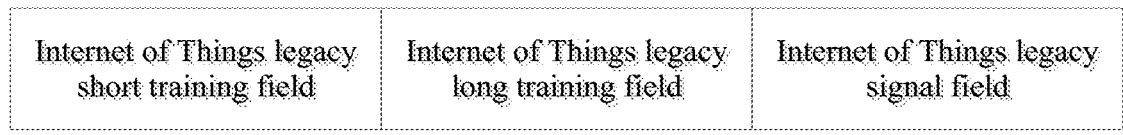
Figures 2, 6:
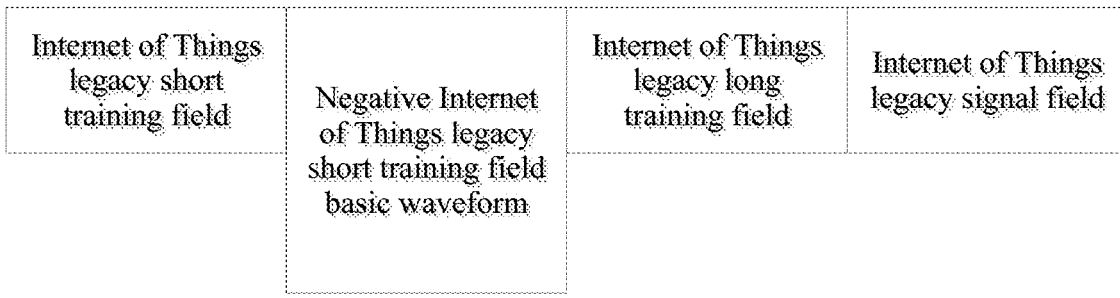

In one embodiment, as shown in FIG. 5-6, the ACK frame in the foregoing block S502 may further include one OFDM symbol, and the one OFDM symbol is used to carry the address information of the STA.

FIG. 6 shows a quick acknowledgement reply method according to still another embodiment of this application. The method is implemented in the WLAN shown in FIG. 1. In this embodiment, a downlink data direction is used as an example. To be specific, a transmission direction in which an access point sends data to a station is used as an example. As shown in FIG. 6, the method includes the following blocks.

Block S601: The AP sends a data frame to the STA.

Block S602: After successfully decoding the downlink data frame, the STA sends an ACK frame to the AP, where the ACK frame includes an Internet of Things short training field (IoT-STF), an Internet of Things long training field (IoT-LTF), and an Internet of Things signal field (IoT-SIG), and the IoT-SIG is used to carry an identifier of the STA.

A time-domain signal of the IoT-STF in the foregoing block S602 may be obtained by repeating, for N times, a time-domain signal sequence used by an L-LTF, where a period is 3.2 microseconds, and N is equal to 2, 3, 4, 5, or the like. A time-domain signal of the IoT-LTF may be obtained by repeating, for M times, the time-domain signal sequence used by the L-LTF or obtained by repeating, for M times, a result obtained by converting bit values in the time-domain signal sequence used by the L-LTF into negative values, where M is equal to 2, 3, 4, 5, or the like. Particularly, the IoT-LTF first includes a result obtained by converting bit values in one time-domain signal used by the L-LTF into negative values, and then a result obtained by repeating the L-LTF for M−1 times. The IoT-STF is used for synchronization and CFO measurement of an IoT device. A specific manner is the same as that of the L-STF, and a difference lies merely in that a basic sequence of the L-STF is changed to a basic sequence of the L-LTF or a result obtained by converting bit values in the basic sequence of the L-STF into negative values. The IoT-LTF uses a plurality of time domain repetitions to improve channel sounding performance. The IoT-SIG may be transmitted by using a 20 MHz frequency band, or may be transmitted by using a 10 MHz frequency band, or even may be transmitted by using a 4 or 5 MHz frequency band. The IoT-SIG may use a plurality of time domain repetitions to improve transmission performance, and a repetition quantity may be 2, 3, 4, 5, or the like. Particularly, if the IoT-SIG is transmitted by using a non-20 MHz frequency band, bandwidth occupied by the IoT-LTF may be the same as bandwidth occupied by the IoT-SIG.

A frequency-domain sequence used by the IoT-STF is:

IoT-STF$_{-26, 26}$={1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1}, and the frequency-domain sequence indicates a signal transmitted on subcarriers whose frequency domain subcarrier numbers are from −26 to 26. The frequency-domain signal undergoes inverse Fourier transform and is transformed into a time-domain signal, and then is transmitted by a transmit end.

A frequency-domain sequence used by the IoT-LTF may be:

IoT-LTF$_{-26, 26}$=IoT-STF$_{-26, 26}$; or

IoT-LTF$_{-26, 26}$={−1, −1, 1, 1, −1, −1, 1, −1, 1, −1, −1, −1, −1, −1, −1, 1, 1, −1, −1, 1, 1, −1, 1, −1, 1, −1, −1, −1, −1, 0, −1, 1, 1, −1, −1, 1, −1, 1, −1, 1, 1, 1, 1, 1, −1, −1, 1, 1, −1, 1, −1, 1, −1, −1, −1, −1}.

A data structure of the foregoing ACK frame is shown in FIG. 6-1.

Block S603: The AP completes functions such as synchronization by using the IoT-STF and the IoT-LTF, obtains a channel gain of a frequency band in which the AP is located, decodes the IoT-SIG, and if the IoT-SIG transmits an identifier of a previous downlink data receive end, performs matching between an obtained result and a receive end address or a STA ID of a previous downlink data packet.

The ACK in the technical solution provided in this still another embodiment of this application includes the IoT-STF, the IoT-LTF, and the IoT-SIG The ACK frame only includes a physical layer part, and does not have a MAC part of the ACK frame. Therefore, a length of the ACK is reduced, and system overheads are reduced.

In one embodiment, as shown in FIG. 6-2, the ACK frame in the foregoing block S602 may further include a negative IoT-STF basic waveform. A purpose of the negative IoT-STF basic waveform is to enable a falling edge of a related signal to appear during synchronization. To achieve this purpose, a frequency-domain sequence used by the negative IoT-STF basic waveform should be a result of converting bit values in a frequency-domain sequence used by the IoT-STF into negative values, that is:

negative IoT-STF basic waveform$_{-26, 26}$={−1, −1, 1, 1, −1, −1, 1, −1, 1, −1, −1, −1, −1, −1, −1, 1, 1, −1, −1, 1, −1, 1, −1, −1, −1, −1, 0, −1, 1, 1, −1, −1, 1, −1, 1, −1, 1, 1, 1, 1, 1, 1, −1, −1, 1, 1, −1, 1, −1, 1, −1, −1, −1, −1}.

The IoT-LTF may be transmitted by using a 10 MHz bandwidth. In this case, one of the following four frequency-domain sequences may be selected based on a location of the used 10 MHz in the entire 20 MHz:

IoT-LTF-left$_{-26,26}$={1, 1, −1, −1, 1, 1, −1, 1, −1, 1, 1, 1, 1, 1, 1, −1, −1, 1, 1, −1, 1, −1, 1, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0}, and the frequency domain signal undergoes inverse Fourier transform and is transformed into a time-domain signal;

IoT-LTF-right$_{-26,26}$={0, 0, 0, 0, 0, 0, 0, 0, 0, 0, 0, 0, 0, 0, 0, 0, 0, 0, 0, 0, 0, 0, 0, 0, 0, 0, 0, 1, −1, −1, 1, 1, −1, 1, −1, 1, −1, −1, −1, −1, −1, −1, 1, 1, −1, −1, 1, −1, 1, −1, 1, 1, 1}, and the frequency domain signal undergoes inverse Fourier transform and is transformed into a time-domain signal;

IoT-LTF-left$_{-26, 26}$=−1,−1, 1, 1, −1, −1, 1, −1, 1, −1, −1, −1, −1, −1, −1, 1, 1, −1, −1, 1, −1, 1, −1, −1, −1, −1, 0, 0, 0, 0, 0, 0, 0, 0, 0, 0, 0, 0, 0, 0, 0, 0, 0, 0, 0, 0, 0, 0, 0, 0, 0, 0, 0}, or IoT-LTF-right$_{-26, 26}$={0, 0, 0, 0, 0, 0, 0, 0, 0, 0, 0, 0, 0, 0, 0, 0, 0, 0, 0, 0, 0, 0, 0, 0, 0, 0, 0, −1, 1, 1, −1, −1, 1, −1, 1, −1, 1, 1, 1, 1, 1, 1, −1, −1, 1, 1, −1, 1, −1, 1, −1, −1, −1, −1}.

In other embodiments, frequency-domain sequence of the IoT-LTF includes but is not limited to the foregoing four types. When the IoT-SIG uses 10 MHz, an MCS0 or an MCS10 may be used, and a time domain is repeated for a plurality of times, to improve transmission performance.

In embodiment, before block S602, the foregoing method may further include the following blocks.

Block S601-1: After failing to decode the downlink data frame, the STA sends a negative acknowledgement (NACK) to the AP. For a data structure of the NACK, refer to the data structures shown in FIG. 6-1 and FIG. 6-2. A difference between the data structure of the NACK and those shown in FIG. 6-1 and FIG. 6-2 lies in that a physical layer part of the NACK needs to carry an indication that the AP fails to decode the downlink data frame.

Block S602-2: After receiving the NACK, the AP re-sends the data frame to the STA.

In this technical solution, a relatively long occupation time of a channel can be avoided. The long channel occupation time may occur because if the STA fails to perform decoding, no ACK frame is fed back to the AP. After detection times out, the AP performs retransmission. In this scenario, timeout time is occupied. Because for the AP, the channel does not send any data in a timeout time period, the channel inevitably occupies the timeout time. In contrast, in this solution offered by the embodiment, because the STA sends the NACK, the AP may learn, by using the NACK, that the STA fails to perform decoding, and can directly perform retransmission without waiting for timeout. Therefore, this solution can reduce a channel occupation time caused by a decoding error.

Figure 7:
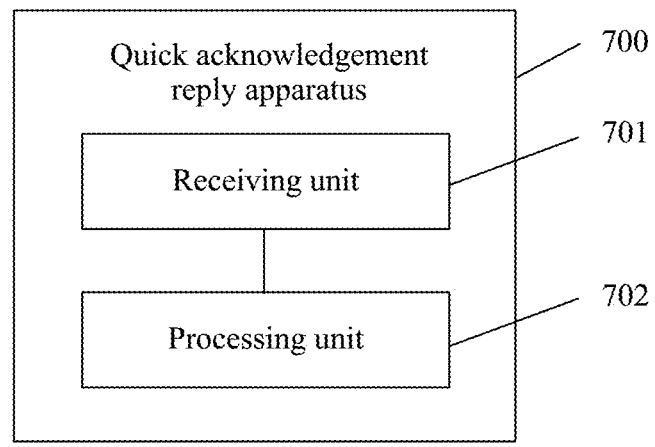
FIG. 7 is a schematic structural diagram of a quick acknowledgement reply apparatus according to this application.

FIG. 7 shows a quick acknowledgement reply apparatus 700 according to this application. The apparatus includes:

a receiving unit 701, configured to receive a data frame sent by an acknowledgement receiving apparatus; and a processing unit 702, configured to: after successfully decoding the data frame, generate and reply with an acknowledgement ACK frame, where the ACK frame includes a physical layer part; and the physical layer part includes: a legacy short training field L-STF, a legacy long training field L-LTF, and identification information of a station.

The foregoing quick acknowledgement reply apparatus 700 removes a remaining part of the ACK frame, and therefore the quick acknowledgement reply apparatus 700 reduces a length of the ACK frame and reduces system overheads.

In one embodiment, for a specific structure and description of the physical layer part in the quick acknowledgement reply apparatus 700, refer to a description in an embodiment or another embodiment of this application. Details are not described herein again.

Figure 8:
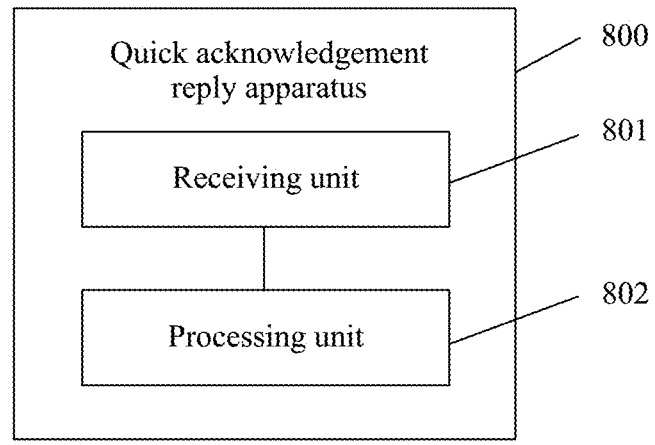
FIG. 8 is a schematic structural diagram of another quick acknowledgement reply apparatus according to this application.

FIG. 8 shows another quick acknowledgement reply apparatus 800 according to this application. The apparatus includes:

a receiving unit 801, configured to receive a data frame sent by an acknowledgement receiving apparatus; and a processing unit 802, configured to: after successfully decoding the data frame, generate and reply with an acknowledgement ACK frame, where the ACK frame includes a physical layer part; and the physical layer part includes: an Internet of Things short training field IoT-STF, an Internet of Things long training field IoT-LTF, and an Internet of Things signal field IoT-SIG; where a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame.

The quick acknowledgement reply apparatus shown in FIG. 8 removes a remaining part of the ACK frame, and therefore the quick acknowledgement reply apparatus 800 reduces a length of the ACK frame and reduces system overheads.

In one embodiment, for a specific structure and description of the physical layer part in the quick acknowledgement reply apparatus 800, refer to a description in still another embodiment of this application. Details are not described herein again.

Figure 9:
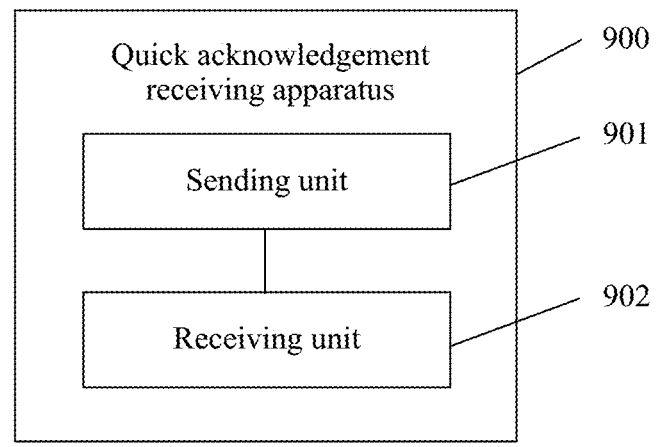
FIG. 9 is a schematic structural diagram of a quick acknowledgement receiving apparatus according to this application.

FIG. 9 shows a quick acknowledgement receiving apparatus 900 according to this application. The apparatus includes:

a sending unit 901, configured to send a data frame to an acknowledgement sending apparatus; and a receiving unit 902, configured to receive an ACK frame sent by the acknowledgement sending apparatus, where the ACK frame includes a physical layer part; and the physical layer part includes: a legacy short training field L-STF, a legacy long training field L-LTF, and identification information of a station.

For a specific description of the physical layer part, refer to descriptions in an embodiment and another embodiment of this application. Details are not described herein again.

Figure 10:
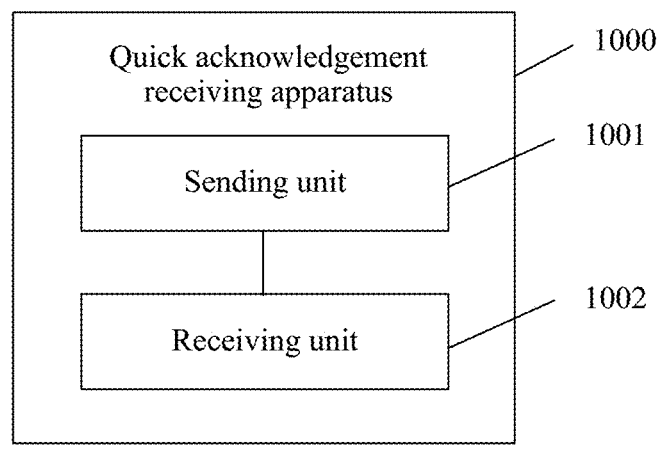
FIG. 10 is a schematic structural diagram of another quick acknowledgement receiving apparatus according to this application.

FIG. 10 shows a quick acknowledgement receiving apparatus 1000 according to this application. The apparatus includes:

a sending unit 1001, configured to send a data frame to an acknowledgement sending apparatus;

a receiving unit 1002, configured to receive an acknowledgement ACK frame sent by the acknowledgement sending apparatus, where the ACK frame includes a physical layer part; and the physical layer part includes: an Internet of Things short training field IoT-STF, an Internet of Things long training field IoT-LTF, and an Internet of Things signal field IoT-SIG; where a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame; and a processing unit, configured to: determine, based on the indication information, that the ACK frame is the ACK of the data frame, extract the identification information of the acknowledgement sending apparatus in the IoT-SIG, and match the identification information of the acknowledgement sending apparatus with a receive end address or a station identifier of the sent data frame, to identify the acknowledgement sending apparatus.

In one embodiment, for a specific structure and description of the physical layer part in the quick acknowledgement receiving apparatus 1000, refer to a description in still another embodiment of this application. Details are not described herein again.

Figure 11:
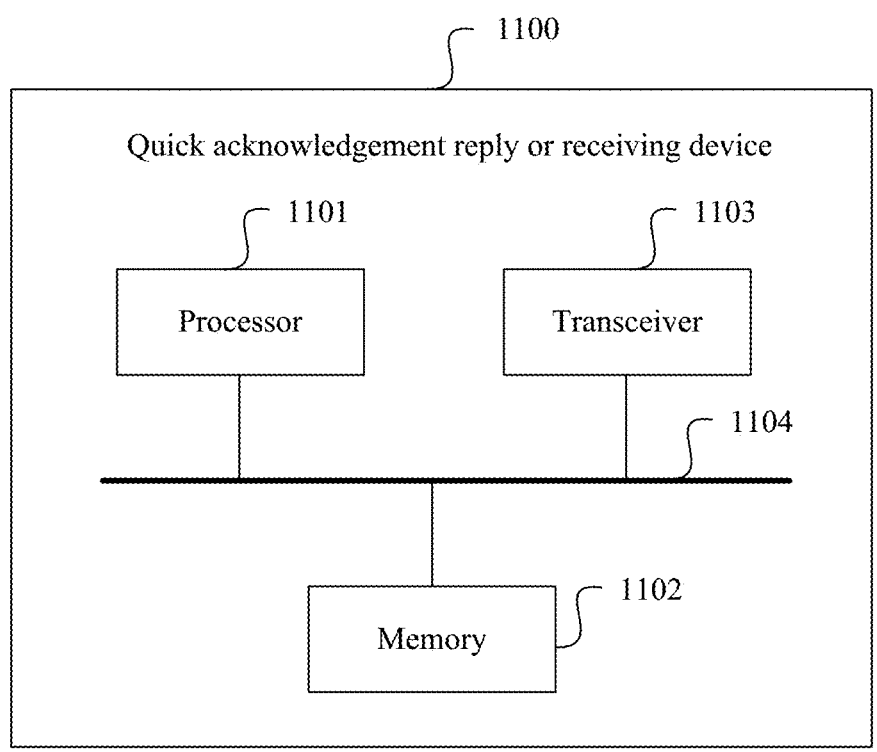
FIG. 11 is a schematic structural diagram of hardware of a quick acknowledgement reply or receiving apparatus according to this application.

FIG. 11 is a simplified schematic diagram of a quick acknowledgement reply device or a quick acknowledgement receiving device according to an embodiment of this application. The quick acknowledgement reply device 1100 may be a device such as a station or an access point. As shown in FIG. 11, the quick acknowledgement reply device 1100 includes: a processor 1101, a memory 1102, a transceiver 1103, and a bus 1104. The transceiver 1103 is configured to send and receive data to and from an external device. There may be one or more processors 1101 in the device 80. In some embodiments of this application, the processor 1101, the memory 1102, and the transceiver 1103 may be connected by using a bus system or in other manners. The quick acknowledgement reply device 1100 may be configured to perform the method shown in FIG. 4, FIG. 5, or FIG. 6. For meanings and examples of the terms in this embodiment, refer to the description corresponding to FIG. 4, FIG. 5, or FIG. 6. Details are not described herein again.

The transceiver 1103 is configured to receive a data frame sent by an acknowledgement receiving apparatus.

The memory 1102 stores program code. The processor 1101 is configured to invoke the program code stored in the memory 1102, to perform the following operations.

The processor 1101 is configured to: after successfully decoding the data frame, generate and reply with an acknowledgement ACK frame, where the ACK frame includes a physical layer part; and the physical layer part includes: a legacy short training field L-STF, a legacy long training field L-LTF, and identification information of a station.

It should be noted that, in a communications system, for example, for a downlink, the quick acknowledgement reply device 1100 may be a station; for an uplink, the quick acknowledgement reply device 1100 may be an access point.

It should be noted that the processor 1101 herein may be one processing element, or may be a general term for a plurality of processing elements. For example, the processing element may be a central processing unit (Central Processing Unit, CPU), or may be an application-specific integrated circuit (Application Specific Integrated Circuit, ASIC), or is configured as one or more integrated circuits for implementing the embodiments of this application, for example, one or more microprocessors (digital signal processor, DSP), or one or more field programmable gate arrays (Field Programmable Gate Array, FPGA).

The memory 1102 may be a storage apparatus, or may be a general term for a plurality of storage elements, and is configured to store executable program code, or parameters, data, and the like that are required for running an application program running apparatus. In addition, the memory 1102 may include a random access memory (RAM), or may include a non-volatile memory (non-volatile memory), such as a magnetic disk memory or a flash (Flash) memory.

The bus 1104 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be categorized as an address bus, a data bus, a control bus, or the like. For ease of indication, the bus is indicated by using only one bold line in FIG. 11. However, it does not indicate that there is only one bus or only one type of bus.

It should be noted that, to make the description brief, the foregoing method embodiments are expressed as a series of actions. However, a person skilled in the art should appreciate that this application is not limited to the described action sequence, because according to this application, some blocks may be performed in other sequences or performed simultaneously. In addition, a person skilled in the art should also appreciate that all the embodiments described in the specification are preferred embodiments, and the related actions and modules are not necessarily mandatory to this application.

In the foregoing embodiments, the descriptions of the embodiments have respective focuses. For a part that is not described in detail in an embodiment, reference may be made to related descriptions in other embodiments.

A person of ordinary skill in the art may understand that all or a part of the blocks of the methods in the embodiments may be implemented by a program instructing related hardware. The program may be stored in a computer readable storage medium. The storage medium may include a flash drive, a read-only memory (English: Read-Only Memory, ROM for short), a random access memory (English: Random Access Memory, RAM for short), a magnetic disk, or an optical disk.

The foregoing describes in detail the content download method, the related device, and the system provided in the embodiments of this application. In this specification, specific examples are used to describe the principle and implementations of this application, and the description of the embodiments is only intended to help understand the method and core idea of this application. Meanwhile, a person of ordinary skill in the art may, based on the idea of this application, make modifications with respect to the specific implementations and the application scope. Therefore, the content of this specification shall not be construed as a limitation to this application.

The following are some embodiments or examples of the application:

1. A quick acknowledgement reply method, wherein the method comprises:
receiving, by an acknowledgement sending apparatus, a data frame sent by an acknowledgement receiving apparatus; and after successfully decoding the data frame, generating and replying with, by the acknowledgement sending apparatus, an acknowledgement ACK frame, wherein the ACK frame consists of a physical layer part; and the physical layer part comprises: a legacy short training field L-STF, a legacy long training field L-LTF, and identification information of a station.

2. The method according to claim 1, wherein the identification information of the station is carried in four additional subcarriers, and the four additional subcarriers are subcarriers numbered −28, −27, +27, and +28.

3. The method according to claim 2, wherein the physical layer part comprises a legacy signal field L-SIG 4. The method according to claim 1, wherein the physical layer part comprises a legacy signal field L-SIG, the identification information of the station is carried in a Rate field and a Tail field of the L-SIG, and the L-SIG carries indication information indicating that the ACK frame is an ACK of the data frame.

5. The method according to claim 4, wherein the physical layer part comprises a repeated legacy signal field RL-SIG.

6. The method according to claim 2, wherein the physical layer part comprises a legacy signal field L-SIG, the identification information of the station is carried in a Rate field and a Tail field of the L-SIG, the L-SIG carries indication information indicating that the ACK frame is an ACK of the data frame, and any combination of one or more of the Rate field, the Tail field, and the four subcarriers constitutes the identification information of the station.

7. The method according to claim 1, wherein the physical layer part further comprises: a legacy signal field L-SIG and at least one orthogonal frequency division multiplexing OFDM symbol, wherein the at least one OFDM symbol is used to carry the identification information of the station.

8. The method according to claim 7, wherein the physical layer part further comprises an RL-SIG.

9. The method according to claim 7, wherein when the at least one OFDM symbol is two OFDM symbols, the two OFDM symbols use different modulation schemes to indicate that the ACK frame is an ACK of the data frame.

10. A quick acknowledgement reply method, wherein the method comprises:
receiving, by an acknowledgement sending apparatus, a data frame sent by an acknowledgement receiving apparatus; and after successfully decoding the data frame, generating and replying with, by the acknowledgement sending apparatus, an acknowledgement ACK frame, wherein the ACK frame consists of a physical layer part; and the physical layer part comprises: an Internet of Things short training field IoT-STF, an Internet of Things long training field IoT-LTF, and an Internet of Things signal field IoT-SIG; wherein
a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame.

11. The method according to claim 10, wherein the ACK frame further comprises a negative IoT-STF basic waveform, and the negative IoT-STF basic waveform is a waveform obtained by converting bit values in a frequency-domain sequence of a used short training field IoT-STF into negative values.

12. A quick acknowledgement receiving method, wherein the method comprises:
sending, by an acknowledgement receiving apparatus, a data frame to an acknowledgement sending apparatus; and receiving, by the acknowledgement receiving apparatus, an ACK frame sent by the acknowledgement sending apparatus, wherein the ACK frame consists of a physical layer part; and the physical layer part comprises: a legacy short training field L-STF, a legacy long training field L-LTF, and identification information of a station.

13. The method according to claim 12, wherein the identification information of the station is carried in four additional subcarriers, and the four additional subcarriers are subcarriers numbered −28, −27, +27, and +28; and when detecting that energy on each frequency subcarrier after the L-LTF is less than a specified threshold, the acknowledgement receiving apparatus determines that the ACK frame is an ACK of the data frame.

14. The method according to claim 13, wherein the physical layer part comprises a legacy signal field L-SIG 15. The method according to claim 12, wherein the physical layer part comprises a legacy signal field L-SIG, the identification information of the station is carried in a Rate field and a Tail field of the L-SIG, and the L-SIG carries indication information indicating that the ACK frame is an ACK of the data frame; and the acknowledgement receiving apparatus extracts the indication information to determine that the ACK frame is the ACK of the data frame, extracts values of the Rate field and the Tail field of the L-SIG, and matches the values of the Rate field and the Tail field of the L-SIG with a receive end address or a station identifier of the sent data frame, to identify the acknowledgement sending apparatus.

16. The method according to claim 15, wherein the physical layer part comprises an RL-SIG.

17. The method according to claim 13, wherein the physical layer part comprises a legacy signal field L-SIG, the identification information of the station is carried in a Rate field and a Tail field of the L-SIG, and the L-SIG carries indication information indicating that the ACK frame is an ACK of the data frame; and the acknowledgement receiving apparatus extracts the indication information to determine that the ACK frame is the ACK of the data frame, extracts values of the Rate field and the Tail field of the L-SIG and values of the four subcarriers, and matches a value of any combination of one or more of the values of the Rate field, the Tail field, and the four subcarriers with a receive end address or a station identifier of the sent data frame, to identify the acknowledgement sending apparatus.

18. The method according to claim 12, wherein the physical layer part further comprises: a legacy signal field L-SIG and at least one orthogonal frequency division multiplexing OFDM symbol, wherein the at least one OFDM symbol is used to carry the identification information of the station; and the acknowledgement receiving apparatus extracts a value of the at least one OFDM symbol, and matches the value of the at least one OFDM symbol with a receive end address or a station identifier of the sent data frame, to identify the acknowledgement sending apparatus.

19. The method according to claim 18, wherein when the at least one OFDM symbol is two OFDM symbols, the two OFDM symbols use different modulation schemes; and the acknowledgement receiving apparatus extracts values of the two OFDM symbols, if the OFDM symbols use different modulation schemes, determines that the ACK frame is an ACK of the data frame, and matches the values of the two OFDM symbols with a receive end address or a station identifier of the sent data frame, to identify the acknowledgement sending apparatus.

20. The method according to claim 18, wherein the physical layer part further comprises an RL-SIG.

21. A quick acknowledgement receiving method, wherein the method comprises:

sending, by an acknowledgement receiving apparatus, a data frame to an acknowledgement sending apparatus;

receiving, by the acknowledgement receiving apparatus, an acknowledgement ACK frame sent by the acknowledgement sending apparatus, wherein the ACK frame consists of a physical layer part; and the physical layer part comprises: an Internet of Things short training field IoT-STF, an Internet of Things long training field IoT-LTF, and an Internet of Things signal field IoT-SIG; wherein a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame; and determining, by the acknowledgement receiving apparatus based on the indication information, that the ACK frame is the ACK of the data frame, extracting the identification information of the acknowledgement sending apparatus in the IoT-SIG, and matching the identification information of the acknowledgement sending apparatus with a receive end address or a station identifier of the sent data frame, to identify the acknowledgement sending apparatus.

22. The method according to claim 21, wherein the ACK frame further comprises a negative IoT-STF basic waveform, and the negative IoT-STF basic waveform is a waveform obtained by converting bit values in a frequency-domain sequence of a used short training field IoT-STF into negative values.

23. A quick acknowledgement reply method, wherein the method comprises:

receiving, by an acknowledgement sending apparatus, a data frame sent by an acknowledgement receiving apparatus; and after successfully decoding the data frame, generating and replying with, by the acknowledgement sending apparatus, an acknowledgement ACK frame, wherein the ACK frame consists of a physical layer part; and the physical layer part comprises: a legacy short training field L-STF and a legacy long training field L-LTF.

24. A quick acknowledgement receiving method, wherein the method comprises:

sending, by an acknowledgement receiving apparatus, a data frame to an acknowledgement sending apparatus;

receiving, by the acknowledgement receiving apparatus, an ACK frame sent by the acknowledgement sending apparatus, wherein the ACK frame consists of a physical layer part; and the physical layer part comprises a legacy short training field L-STF and a legacy long training field L-LTF; and when detecting that energy on each frequency subcarrier after the L-LTF is less than a specified threshold, determining, by the acknowledgement receiving apparatus, that the ACK frame is an ACK of the data frame.

25. A quick acknowledgement reply apparatus, wherein the apparatus comprises:

a receiving unit, configured to receive a data frame sent by an acknowledgement receiving apparatus; and a processing unit, configured to: after successfully decoding the data frame, generate and reply with an acknowledgement ACK frame, wherein the ACK frame consists of a physical layer part; and the physical layer part comprises: a legacy short training field L-STF, a legacy long training field L-LTF, and identification information of a station.

26. The apparatus according to claim 25, wherein the identification information of the station is carried in four additional subcarriers, and the four additional subcarriers are subcarriers numbered −28, −27, +27, and +28.

27. The apparatus according to claim 26, wherein the physical layer part comprises a legacy signal field L-SIG.

28. The apparatus according to claim 25, wherein the physical layer part comprises a legacy signal field L-SIG, the identification information of the station is carried in a Rate field and a Tail field of the L-SIG, and the L-SIG carries indication information indicating that the ACK frame is an ACK of the data frame.

29. The apparatus according to claim 28, wherein the physical layer part comprises a repeated legacy signal field RL-SIG.

30. The apparatus according to claim 26, wherein the physical layer part comprises a legacy signal field L-SIG, the identification information of the station is carried in a Rate field and a Tail field of the L-SIG, the L-SIG carries indication information indicating that the ACK frame is an ACK of the data frame, and any combination of one or more of the Rate field, the Tail field, and the four subcarriers constitutes the identification information of the station.

31. The apparatus according to claim 25, wherein the physical layer part further comprises: a legacy signal field L-SIG and at least one orthogonal frequency division multiplexing OFDM symbol, wherein the at least one OFDM symbol is used to carry the identification information of the station.

32. The apparatus according to claim 31, wherein the physical layer part further comprises an RL-SIG.

33. The apparatus according to claim 31, wherein when the at least one OFDM symbol is two OFDM symbols, the two OFDM symbols use different modulation schemes to indicate that the ACK frame is an ACK of the data frame.

34. A quick acknowledgement reply apparatus, wherein the apparatus comprises:
a receiving unit, configured to receive a data frame sent by an acknowledgement receiving apparatus; and
a processing unit, configured to: after successfully decoding the data frame, generate and reply with an acknowledgement ACK frame, wherein the ACK frame consists of a physical layer part; and the physical layer part comprises: an Internet of Things short training field IoT-STF, an Internet of Things long training field IoT-LTF, and an Internet of Things signal field IoT-SIG; wherein
a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame.

35. The method according to claim 34, wherein the ACK frame further comprises a negative IoT-STF basic waveform, and the negative IoT-STF basic waveform is a waveform obtained by converting bit values in a frequency-domain sequence of a used short training field IoT-STF into negative values.

36. A quick acknowledgement receiving apparatus, wherein the apparatus comprises:
a sending unit, configured to send a data frame to an acknowledgement sending apparatus; and
a receiving unit, configured to receive an ACK frame sent by the acknowledgement sending apparatus, wherein the ACK frame consists of a physical layer part; and the physical layer part comprises: a legacy short training field L-STF, a legacy long training field L-LTF, and identification information of a station.

37. The apparatus according to claim 36, wherein the identification information of the station is carried in four additional subcarriers, and the four additional subcarriers are subcarriers numbered −28, −27, +27, and +28; and the acknowledgement receiving apparatus further comprises a processing unit, configured to: when detecting that energy on each frequency subcarrier after the L-LTF is less than a specified threshold, determine that the ACK frame is an ACK of the data frame.

38. The apparatus according to claim 37, wherein the physical layer part comprises a legacy signal field L-SIG 39. The apparatus according to claim 36, wherein the physical layer part comprises a legacy signal field L-SIG, the identification information of the station is carried in a Rate field and a Tail field of the L-SIG, and the L-SIG carries indication information indicating that the ACK frame is an ACK of the data frame; and
the acknowledgement receiving apparatus further comprises a processing unit, configured to: extract the indication information to determine that the ACK frame is the ACK of the data frame, extract values of the Rate field and the Tail field of the L-SIG, and match the values of the Rate field and the Tail field of the L-SIG with a receive end address or a station identifier of the sent data frame, to identify the acknowledgement sending apparatus.

40. The apparatus according to claim 39, wherein the physical layer part comprises an RL-SIG.

41. The apparatus according to claim 37, wherein the physical layer part comprises a legacy signal field L-SIG, the identification information of the station is carried in a Rate field and a Tail field of the L-SIG, and the L-SIG carries indication information indicating that the ACK frame is an ACK of the data frame; and
the acknowledgement receiving apparatus extracts the indication information to determine that the ACK frame is the ACK of the data frame, extracts values of the Rate field and the Tail field of the L-SIG and values of the four subcarriers, and matches a value of any combination of one or more of the values of the Rate field, the Tail field, and the four subcarriers with a receive end address or a station identifier of the sent data frame, to identify the acknowledgement sending apparatus.

42. The apparatus according to claim 36, wherein the physical layer part further comprises: a legacy signal field L-SIG and at least one orthogonal frequency division multiplexing OFDM symbol, wherein the at least one OFDM symbol is used to carry the identification information of the station; and
the acknowledgement receiving apparatus further comprises a processing unit, configured to: extract a value of the at least one OFDM symbol, and match the value of the at least one OFDM symbol with a receive end address or a station identifier of the sent data frame, to identify the acknowledgement sending apparatus.

43. The apparatus according to claim 42, wherein when the at least one OFDM symbol is two OFDM symbols, the two OFDM symbols use different modulation schemes; and the acknowledgement receiving apparatus extracts values of the two OFDM symbols, if the OFDM symbols use different modulation schemes, determines that the ACK frame is an ACK of the data frame, and matches the values of the two OFDM symbols with a receive end address or a station identifier of the sent data frame, to identify the acknowledgement sending apparatus.

44. The apparatus according to claim 42, wherein the physical layer part further comprises an RL-SIG.

45. A quick acknowledgement receiving apparatus, wherein the apparatus comprises:
a sending unit, configured to send a data frame to an acknowledgement sending apparatus;
a receiving unit, configured to receive an acknowledgement ACK frame sent by the acknowledgement sending apparatus, wherein the ACK frame consists of a physical layer part; and the physical layer part comprises: an Internet of Things short training field IoT-STF, an Internet of Things long training field IoT-LTF, and an Internet of Things signal field IoT-SIG; wherein a time-domain signal of the IoT-STF is a training field obtained by repeating, for N times, a time-domain signal sequence used by a legacy long training field L-LTF; and a time-domain signal of the IoT-LTF is a training field obtained by repeating, for M times, the time-domain signal sequence used by the L-LTF, and the IoT-SIG carries identification information of the acknowledgement sending apparatus and indication information indicating that the ACK frame is an ACK of the data frame; and a processing unit, configured to: determine, based on the indication information, that the ACK frame is the ACK of the data frame, extract the identification information of the acknowledgement sending apparatus in the IoT-SIG, and match the identification information of the acknowledgement sending apparatus with a receive end address or a station identifier of the sent data frame, to identify the acknowledgement sending apparatus.

46. The apparatus according to claim 45, wherein the ACK frame further comprises a negative IoT-STF basic waveform, and the negative IoT-STF basic waveform is a waveform obtained by converting bit values in a frequency-domain sequence of a used short training field IoT-STF into negative values.

47. A quick acknowledgement reply apparatus, wherein the apparatus comprises:
a receiving unit, configured to receive a data frame sent by an acknowledgement receiving apparatus; and
a processing unit, configured to: after successfully decoding the data frame, generate and reply with an acknowledgement ACK frame, wherein the ACK frame consists of a physical layer part; and the physical layer part comprises: a legacy short training field L-STF and a legacy long training field L-LTF.

48. A quick acknowledgement receiving apparatus, wherein the apparatus comprises:
a sending unit, configured to send a data frame to an acknowledgement sending apparatus;
a receiving unit, configured to receive an ACK frame sent by the acknowledgement sending apparatus, wherein the ACK frame consists of a physical layer part; and the physical layer part comprises a legacy short training field L-STF and a legacy long training field L-LTF; and
a processing unit, configured to: when detecting that energy on each frequency subcarrier after the L-LTF is less than a specified threshold, determine that the ACK frame is an ACK of the data frame.

What is claimed is:

1. A quick acknowledgement reply method, comprising:
receiving, by an acknowledgement sending apparatus, a data frame sent by an acknowledgement receiving apparatus; and
in response to successfully decoding the data frame, generating and replying with, by the acknowledgement sending apparatus, an acknowledgement ACK frame, wherein the ACK frame comprises a physical layer part, and wherein the physical layer part comprises: a legacy short training field (L-STF), a legacy long training field (L-LTF), a legacy signal field (L-SIG), and identification information of a station carried in the L-SIG, wherein the identification information of the station is carried in a Rate field and a Tail field of the L-SIG and wherein the L-SIG carries indication information indicating that the ACK frame is an ACK of the data frame.

2. The method according to claim 1, wherein the identification information of the station is carried in four additional subcarriers, and wherein the four additional subcarriers comprise subcarriers numbered −28, −27, +27, and +28.

3. The method according to claim 2, wherein the identification information of the station is indicated by one or more of the Rate field, the Tail field, and the four subcarriers.

4. The method according to claim 1, wherein the physical layer part further comprises: at least one orthogonal frequency division multiplexing (OFDM) symbol, wherein the at least one OFDM symbol is used to carry the identification information of the station.

5. A quick acknowledgement receiving method comprising:
sending, by an acknowledgement receiving apparatus, a data frame to an acknowledgement sending apparatus; and
receiving, by the acknowledgement receiving apparatus, an ACK frame sent by the acknowledgement sending apparatus, wherein the ACK frame comprises a physical layer part, and wherein the physical layer part comprises: a legacy short training field (L-STF), a legacy signal field (L-SIG), a legacy long training field (L-LTF), and identification information of a station carried in the L-SIG, wherein the identification information of the station is carried in a Rate field and a Tail field of the L-SIG and wherein the L-SIG carries indication information indicating that the ACK frame is an ACK of the data frame.

6. The method according to claim 5, wherein the identification information of the station is carried in four additional subcarriers, and wherein the four additional subcarriers comprise subcarriers numbered −28, −27, +27, and +28, the method further comprising:
detecting, by the acknowledgement receiving apparatus, that energy on each frequency subcarrier of the L-LTF is less than a specified threshold, and
determining, by the acknowledgement receiving apparatus, that the ACK frame is an ACK of the data frame.

7. The method according to claim 5, the method further comprising:
extracting, by the acknowledgement receiving apparatus, the indication information to determine that the ACK frame is the ACK of the data frame;
extracting, by the acknowledgement receiving apparatus, values of the Rate field and the Tail field of the L-SIG; and
matching, by the acknowledgement receiving apparatus, the values of the Rate field and the Tail field of the L-SIG with a receive end address or a station identifier of the sent data frame, to identify the acknowledgement sending apparatus.

8. The method according to claim 6, the method further comprising:
extracting, by the acknowledgement receiving apparatus, the indication information to determine that the ACK frame is the ACK of the data frame;
extracting, by the acknowledgement receiving apparatus, values of the Rate field and the Tail field of the L-SIG and values of the four subcarriers; and
matching, by the acknowledgement receiving apparatus, one or more of the values of the Rate field, the Tail field, and the four subcarriers with a receive end address or a station identifier of the sent data frame, to identify the acknowledgement sending apparatus.

9. The method according to claim 5, wherein the physical layer part further comprises: at least one orthogonal frequency division multiplexing (OFDM) symbol, wherein the at least one OFDM symbol is used to carry the identification information of the station, the method further comprising:

extracting, by the acknowledgement receiving apparatus, a value of the at least one OFDM symbol; and matching, by the acknowledgement receiving apparatus, the value of the at least one OFDM symbol with a receive end address or a station identifier of the sent data frame, to identify the acknowledgement sending apparatus.

10. A quick acknowledgement reply apparatus comprising:

a receiving unit to receive a data frame sent by an acknowledgement receiving apparatus; and a processing unit to decode the data frame, and when the data frame is successfully decoded, generate and reply with an acknowledgement ACK frame, wherein the ACK frame comprises a physical layer part, and wherein the physical layer part comprises: a legacy short training field (L-STF), a legacy long training field (L-LTF), a legacy signal field (L-SIG), and identification information of a station carried in the L-SIG, wherein the identification information of the station is carried in a Rate field and a Tail field of the L-SIG and wherein the L-SIG carries indication information indicating that the ACK frame is an ACK of the data frame.

11. The apparatus according to claim 10, wherein the identification information of the station is carried in four additional subcarriers, and wherein the four additional subcarriers comprise subcarriers numbered −28, −27, +27, and +28.

12. The apparatus according to claim 11, wherein the identification information of the station is indicated by one or more of the Rate field, the Tail field, and the four subcarriers.

13. The apparatus according to claim 10, wherein the physical layer part further comprises: at least one orthogonal frequency division multiplexing (OFDM) symbol, wherein the at least one OFDM symbol is used to carry the identification information of the station.

14. A quick acknowledgement receiving apparatus, comprising:

a sending unit to send a data frame to an acknowledgement sending apparatus; and a receiving unit, to receive an ACK frame sent by the acknowledgement sending apparatus, wherein the ACK frame comprises a physical layer part, and wherein the physical layer part comprises: a legacy short training field (L-STF), a legacy long training field (L-LTF), a legacy signal field (L-SIG), and identification information of a station carried in the L-SIG, wherein the identification information of the station is carried in a Rate field and a Tail field of the L-SIG and wherein the L-SIG carries indication information indicating that the ACK frame is an ACK of the data frame.

15. The apparatus according to claim 14, wherein the identification information of the station is carried in four additional subcarriers, and wherein the four additional subcarriers comprise subcarriers numbered −28, −27, +27, and +28, the apparatus further comprising:

a processing unit to:
detect that energy on each frequency subcarrier of the L-LTF is less than a specified threshold, and
determine that the ACK frame is an ACK of the data frame.

16. The apparatus according to claim 14, the apparatus further comprising:

a processing unit to:
extract the indication information to determine that the ACK frame is the ACK of the data frame,
extract values of the Rate field and the Tail field of the L-SIG, and
match the values of the Rate field and the Tail field of the L-SIG with a receive end address or a station identifier of the sent data frame, to identify the acknowledgement sending apparatus.

17. The apparatus according to claim 15, the apparatus further comprising:

a processor unit to:
extract the indication information to determine that the ACK frame is the ACK of the data frame,
extract values of the Rate field and the Tail field of the L-SIG and values of the four subcarriers, and
match one or more of the values of the Rate field, the Tail field, and the four subcarriers with a receive end address or a station identifier of the sent data frame, to identify the acknowledgement sending apparatus.

18. The apparatus according to claim 14, wherein the physical layer part further comprises: at least one orthogonal frequency division multiplexing (OFDM) symbol, wherein the at least one OFDM symbol is used to carry the identification information of the station, the apparatus further comprising:

a processing unit to:
extract a value of the at least one OFDM symbol, and
match the value of the at least one OFDM symbol with a receive end address or a station identifier of the sent data frame, to identify the acknowledgement sending apparatus.

* * * * *